US008268506B2

(12) United States Patent
Dietrich et al.

(10) Patent No.: US 8,268,506 B2
(45) Date of Patent: Sep. 18, 2012

(54) FUEL CELL STRUCTURE AND SEPARATOR PLATE FOR USE THEREIN

(75) Inventors: Philipp Dietrich, Unterendingen (CH); Marcel Hofer, Villmergen (CH); Felix Buechi, Langenthal (CH)

(73) Assignee: Belenos Clean Power Holding AG, Bienne (CH)

( * ) Notice: Subject to any disclaimer, the term of this patent is extended or adjusted under 35 U.S.C. 154(b) by 393 days.

(21) Appl. No.: 12/705,188

(22) Filed: Feb. 12, 2010

(65) Prior Publication Data

US 2010/0209821 A1 Aug. 19, 2010

(30) Foreign Application Priority Data

Feb. 12, 2009 (EP) ..................... 09152701

(51) Int. Cl.
*H01M 8/02* (2006.01)
(52) U.S. Cl. .............. 429/514; 429/456; 429/457
(58) Field of Classification Search .............. 429/514
See application file for complete search history.

(56) References Cited

U.S. PATENT DOCUMENTS 6,048,633 A * 4/2000 Fujii et al. ............... 429/456
6,266,011 B1 7/2001 Hong

FOREIGN PATENT DOCUMENTS

| EP | 0 940 868 A2 | 9/1999 |
| JP | 6-267564 | 9/1994 |
| JP | 2005-190714 | 7/2005 |
| WO | 2008/126358 A1 | 10/2008 |

OTHER PUBLICATIONS

European Search Report issued in corresponding application No. EP 09152701, completed Apr. 30, 2009.

* cited by examiner

*Primary Examiner* — Patrick Ryan
*Assistant Examiner* — Brent Thomas
(74) *Attorney, Agent, or Firm* — Griffin & Szipl, P.C.

(57) ABSTRACT

The present invention concerns a separator plate for use in a fuel cell stack with a substantially circular or oval main surface wherein a fluid flow path is defined by a plurality of channels extending substantially in parallel to each other and leading a fluid from a fluid supply port to a fluid discharge port. Adjacent channels merge such as to decrease the number of parallel channels from the supply port to the discharge port, thereby decreasing a cross sectional area of the flow path. The plurality of parallel channels comprises the following sections:

a first section starting at the fluid supply port wherein the plurality of parallel channels extends in a curve along an outer contour of the main surface,
 a second section wherein the plurality of parallel channels extend at a certain distance to the outer contour in a curve being parallel to said outer contour,
 a C-shaped third section,
 a central horse-iron-shaped forth section extending around a center of the main surface, the orientation of the C-shaped forth section being opposite the orientation of the C-shaped third section,
 a fifth section wherein the plurality of parallel channels is led back to the outer contour of the main surface, and
 a final section wherein the plurality of parallel channels extends in a curve along the outer contour of the main surface until it reaches the fluid discharge port.

11 Claims, 2 Drawing Sheets

FUEL CELL STRUCTURE AND SEPARATOR PLATE FOR USE THEREIN

This application claims priority from European Patent Application No. 09152701.0, filed Feb. 12, 2009, the entire disclosure of which is incorporated herein by reference.

FIELD OF THE INVENTION

The present invention relates to a fuel cell structure and to a separator plate to be used therein.

BACKGROUND OF THE INVENTION

Fuel cell structures comprising a fuel separator plate, an oxidant separator plate and a membrane electrode assembly (MEA) sandwiched between the plates are well known in the art. In fuel cell structures of the solid polymer electrolyte type, the MEA typically comprises a solid polymer electrolyte membrane sandwiched between two porous electrically conductive electrodes, one forming the anode, the other one forming the cathode. Catalysts, e.g. platinum, are disposed on the interface of the membrane and the electrodes.

A fuel gas, for example hydrogen, is supplied to the anode while an oxidant gas such as air (containing oxygen) or oxygen is supplied on the cathode side. The hydrogen will move across the porous anode and will be converted to protons and electrons on the anode catalyst. The protons are moved towards the cathode via the humidified polymer electrolyte. The oxygen moves through the porous cathode and reacts with the protons which have traversed the membrane to form water. The electrons which are generated are led through an external circuit. The current thus generated can directly by used as electric energy. The separator plates are made out of an electrically conductive material and act as current collectors. At the interface between the MEA and the separator plates, one or more fluid flow paths defined by channels formed in the plate direct the reactant fluids to the electrodes while leading the fluid from a supply port to a discharge port.

Typically, a plurality of fuel cell structures is stacked to form a fuel cell stack. The oxidant separator plate of one fuel cell structure then sits back to back with the oxidant separator plate of the neighbouring fuel cell structure, with a cooling flow path not being described herein between the two plates, such that electric current can flow from one fuel cell structure to the other and thus through the entire stack.

The separator plates further provide a fluid barrier between adjacent fuel cell structures so as to keep reactant fluid supplied to the anode of one cell from contaminating reactant fluid supplied to the cathode of another cell.

The arrangement of the fluid flow paths on the separator plate, i.e. the design of the so-called flow-field is crucial for the performance of a fuel cell. One important point is the uniformity of the reaction. While being led from the supply port to the discharge port, the reactant fluids are consumed on the electrode surfaces. The number of reactive molecules per area unit will thus decrease towards the outlet. It is desirable, however, to maintain a constant pressure and a constant flow speed over the complete flow path in order to obtain a uniform reaction distribution across the whole plate.

SUMMARY OF THE INVENTION

The object of the present invention is to provide a separator plate ensuring a uniform reaction distribution over the plate and thus over the electrode. Furthermore, it is an object of the present invention to improve the performance of the fuel cell structure using such a plate and to prevent gas leakage.

These and other objects are achieved by the separator plate according to claim 1.

According to the invention, a separator plate for use in a fuel cell stack has a substantially circular or oval main surface wherein a fluid flow path is defined by a plurality of channels extending substantially in parallel to each other and leading a fluid from a fluid supply port to a fluid discharge port. The fluid may either be a fuel such as hydrogen or an oxidant such as pure oxygen. According to the invention, adjacent channels merge such as to decrease the number of parallel channels from the supply port to the discharge port, thereby decreasing a cross-section of the flow path. The pressure gradient can thus be held substantially constant over the whole fluid flow path, as the reactants being consumed are compensated by the decreasing cross-section of the flow path. According to the invention, the plurality of parallel channels comprises the following sections:

- a first section starting at the fluid supply port wherein the plurality of parallel channels extends in a curve along an outer contour of the main surface,
- a second section wherein the plurality of parallel channels extend at a certain distance to the outer contour in a curve being parallel to said outer contour,
- a C-shaped third section,
- a central horse-iron-shaped forth section extending around a center of the main surface, the orientation of said forth section being opposite the orientation of the C-shaped third section,
- a fifth section wherein the plurality of parallel channels is led back to the outer contour of the main surface, and
- a final section wherein the plurality of parallel channels extends in a curve along the outer contour of the main surface until it reaches the fluid discharge port.

Another object of the present invention is a fuel cell structure comprising an oxidant separator plate, a fuel separator plate, and a membrane electrode assembly (MEA) sandwiched there between. The membrane electrode assembly comprises a fuel electrode, an oxidant electrode and a proton exchange membrane. According to the invention, the separator plates are separator plates as described above.

Experiments carried out by the applicant have shown that the design of the flow field on the separator plate according to the invention leads to outstanding results in terms of performance of the fuel cell structure.

In the fuel cell structure according to the invention, the separator plates may have an identical structure, which means that the geometry of the flow path may be exactly the same for the oxidant separator plate and for the fuel separator plate. However, the depth of the channels may be different. When pure oxygen and pure hydrogen are used, the channels of the fuel separator plate may for instance be less deep than the channels of the oxidant separator plate. Two moles of hydrogen are needed for one mole of oxygen, and the gas volume is thus bigger on the fuel side. However, due to the different dynamic viscosities of the gases, a similar pressure gradient over the flow path can be obtained with deeper channels in the oxidant separator plate.

Preferably, the width of the channels varies over the flow path, e.g. increasing from the supply port to the discharge port. The width of the channels may vary from one section to another, for example the width of the channels in the first section being smaller than in the subsequent sections, or it may vary within one section. The channels are typically separated by ridges, and when the width of the channels decreases, this will preferably be compensated by increasing the width of the ridges. While channels having a small width at the beginning of the flow path improve the water management in the membrane, wider channels when the flow path approaches the discharge port improve the transport of oxidant. The performance is thus improved by such a design.

According to a preferred embodiment of the invention, the number of parallel channels forming the flow path is decreased by merging adjacent channels between the first section and the second section and again between the fifth section and the final section. Preferably, the number of parallel channels forming the flow path is divided by two between the first section and the second section and between the fifth section and the final section, respectively. The applicant has found out that such an arrangement leads to a substantially uniform flow speed over the flow path and thus to a uniform reaction over the whole separator plate and the whole electrode. The uniform flow speed and the uniform pressure gradient will also help to transport water which has been generated towards the outlet.

According to a preferred embodiment of the invention, adjacent channels are separated by ridges, wherein the width of the ridges separating adjacent channels of a same section is smaller than the width of the ridges separating adjacent channels of different sections. Especially if the local conditions in the cell are non-condensing, i.e. when the liquid saturation of the porous gas diffusion layer is low and its permeability is relatively high, the wider ridges between adjacent channels of different sections avoid a gas diffusion across these ridges from one section to the other, i.e. they prevent an undesired shortcut of the flow path.

Preferably, the cross-sectional area of at least one of the channels decreases in the direction of the flow path. Such a decrease of the cross-sectional area has the same effect as the merging of adjacent channels, as in both cases the cross-sectional area of the flow path is decreased, such that a uniform flow velocity can be maintained over the complete flow path.

The channels may have a rectangular cross-section, the depth of the channels decreasing from the supply port of the discharge port. Other cross-sections, for example a trapezoidal cross-section, are also possible.

Preferably, the pressure gradient is substantially the same for all channels of the flow path. This can be realized by a uniform length of the channels or by compensating differences in length by varying the cross-sectional area of the corresponding channels.

In order to provide a uniform length of the channels, the width of a ridge separating two adjacent channels in the flow path may vary over the flow path. For example, when adjacent channels form a curve, the length difference between the channel lying outwards and the channel lying inwards can be compensated by artificially lengthening the inside channel, the two channels thus not remaining completely parallel over the whole flow path.

BRIEF DESCRIPTION OF THE DRAWINGS

The above and other objects, features, and advantages of the present invention will become more apparent in the following description when taken in conjunction with the accompanying drawings in which a preferred embodiment of the present invention is shown by way of illustrative example.

The drawings show.

DETAILED DESCRIPTION OF THE ILLUSTRATIVE EMBODIMENTS

Figure 1:
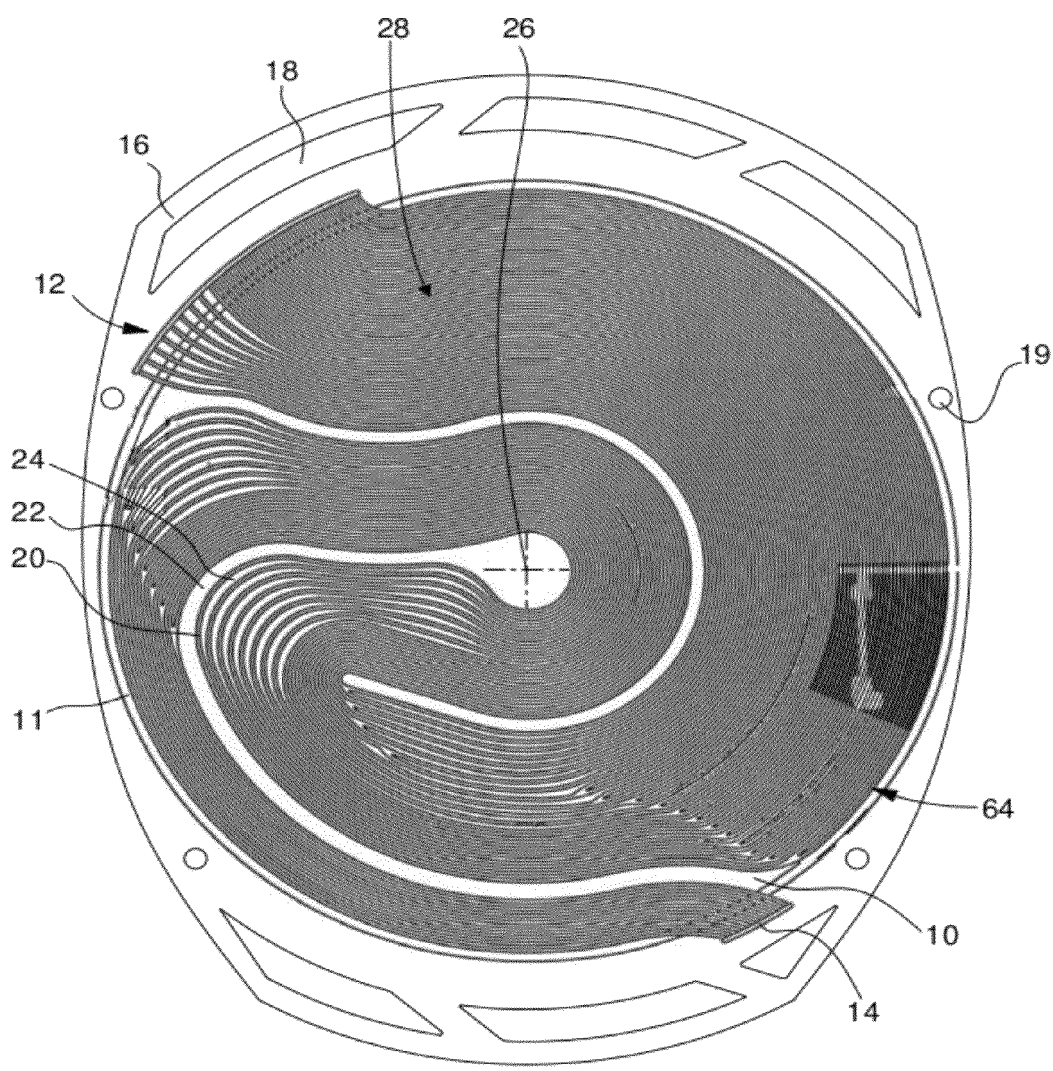
FIG. 1: a top view of a separator plate according to the invention.

As one can see in FIG. 1, the separator plate comprises a substantially circular main surface 10 surrounded by a frame structure 16 provided with openings 18 which are used for assembly of a fuel cell stack. FIG. 1 shows a top view of a separator plate. Typically, channels forming a coolant flow path are formed on the back side of the plate. These coolant flow paths are well known in the art, however, and will not be described herein.

As it can be seen in FIG. 1, a fluid supply port 12 allowing a fuel gas such as hydrogen or an oxidant gas such as oxygen to pass through is provided on the outer contour 11 of the main surface 10. On the opposite side of the main surface 10, a fluid discharge port 14 is provided. A flow path 28 extends from the fluid supply port 12 to the fluid discharge port 14.

Figure 2:
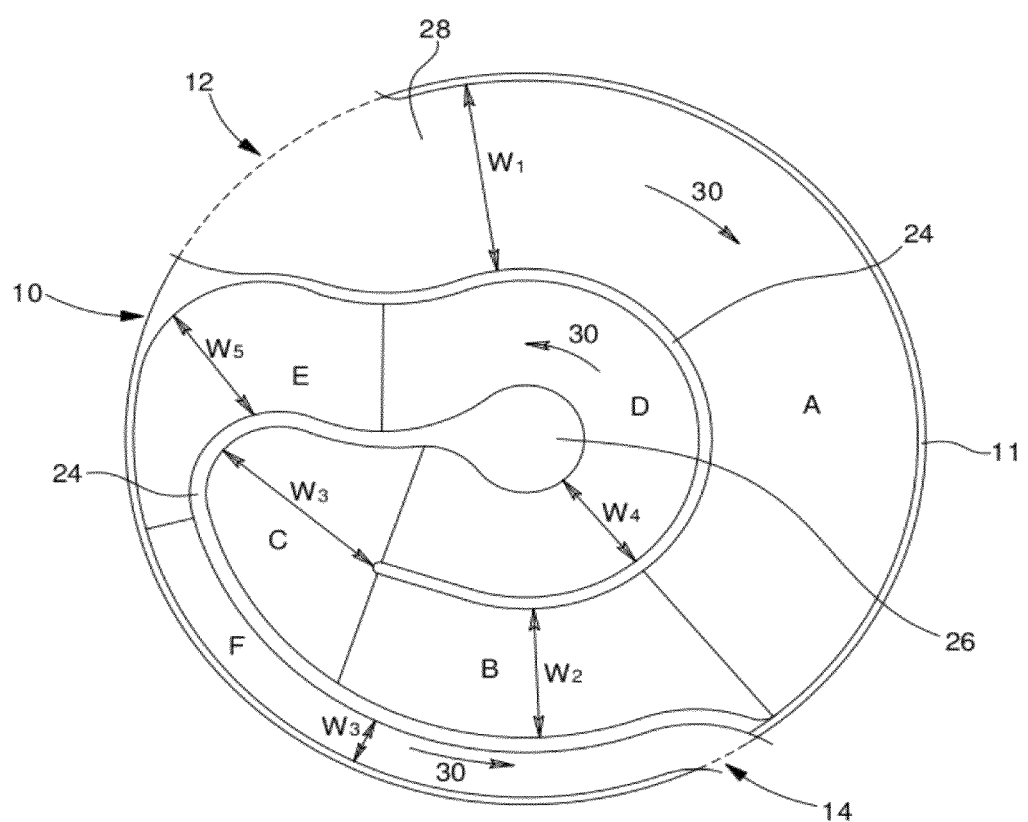
FIG. 2: a schematic top view of a main surface of the separator plate of FIG. 1.

The fluid flow path 28 is defined by a plurality of parallel channels 20 which are separated by ridges 22. The fluid flow path 28 comprises a plurality of sections which are shown schematically in FIG. 2.

A first section A starts at the fluid supply port 12 and extends in a 180° curve along the outer contour 11 of the main surface 10.

In flow direction (cf. arrow 30), this first section A is followed by a second section B extending at a certain distance to the outer contour 11 but still in a curve being parallel to said outer contour. As one can see in FIG. 2, the width $W_2$ of the flow path 28 in section B is smaller than the width $W_1$ in section A, as pairs of adjacent channels merge to form one channel between section A and section B (cf. FIG. 1). The number of parallel channels forming the flow path 28 is thus divided by two between the beginning of the first section A and the end of the second section B.

After the second section B follows a C-shaped third section C wherein the parallel channels make a U-turn and are led to a central horse-iron-shaped fourth section D which extends around a centre 26 of the main surface 10.

In the C-shaped third section C, the channels 20 of the flow path 28 are not strictly parallel, but the channels 20 lying on the outer side of the C-shaped curve are separated from each other by slightly larger ridges 22. The width $W_3$ of the flow path in a direction perpendicular to the flow direction is thus slightly larger than the width $W_4$ of the flow path in the following forth section D, although the number of channels 20 remains unchanged. In said fourth section D, channels 20 extend in parallel to the channels 20 of neighbouring sections A and B lying radially outwards of the central forth section D, but the flow direction (arrow 30) is opposite. To avoid the fluid to flow directly from section A to section B, the ridge 24 separating sections A and D is wider than the ridges 22 separating adjacent channels within the same section.

Section D is followed by a fifth section E wherein the parallel channels are led back to the outer contour 11 of the main surface 10. Just as in the third section 3, adjacent channels 20 are separated by slightly wider ridges 25 just before reaching the outer contour 11, and the width $W_5$ of the flow path 28 is thus again slightly larger than previously in section D, although the number of channels 20 is still the same.

Finally, after having been led back to the outer contour 11 of the main surface in section E, the channels 20 extend again in parallel along the outer contour 11 of the main surface 10 in a final section F until they reach fluid discharge port 14. As one can see in FIG. 1, the number of parallel channels is again divided by two between sections E and F by merging adjacent channels into one channel. The width $W_6$ of the flow path 28 in section F corresponds thus to half the width $W_4$ of the flow path in section D and to a quarter of the width $W_1$ of the flow path 28 in section A.

Due to the particular design of the flow path 28 of the separator plate according to the invention, the surface of the plate can be used completely. The pressure gradient can be held constant, and the gas flow velocity is uniform across the whole flow path 28.

The channels shown in FIG. 1 all have the same width over their complete length. This representation has been chosen for reasons of simplicity, and according to a preferred embodiment of the invention, the width of the channels actually increases from the fluid supply port towards the fluid discharge port. The width can increase stepwise, for example the width may be smallest in the first section A of the flow path, increase in the second section B of the flow path and increase again in the final section F. The width can also increase smoothly over the whole flow path, and one can imagine numerous possibilities of modifying the channel width over the flow path which are all covered by the present claims. A smaller channel width at the beginning of the flow path, next to the fluid supply port, improves the water management in the membrane. Larger channels separated by smaller ridges towards the end of the flow path improve the transport of oxidant. By combining the merging of adjacent channels with the varying width of the channels, one obtains a fuel cell structure having a very good performance.

REFERENCE NUMERALS

10 main surface
11 outer contour
12 fluid supply port
14 fluid discharge port
16 frame structure
18 opening
20 channel
22 ridge
24 ridge
25 ridge
26 centre
28 flow path
30 flow direction
A first section
B second section
C third section
D fourth section
E fifth section
F final section

What is claimed is:

1. A separator plate for use in a fuel cell stack with a substantially circular or oval main surface wherein a fluid flow path is defined by a plurality of channels extending substantially in parallel to each other and leading a fluid from a fluid supply port to a fluid discharge port, wherein adjacent channels merge such as to decrease the number of parallel channels from the supply port to the discharge port, thereby decreasing a cross sectional area of the flow path, wherein the width of the channels varies over the flow path, increasing from the supply port to the discharge port, and wherein the plurality of parallel channels comprises the following sections:

a first section starting at the fluid supply port wherein the plurality of parallel channels extends in a curve along an outer contour of the main surface,
   a second section wherein the plurality of parallel channels extend at a certain distance to the outer contour in a curve being parallel to said outer contour,
   a C-shaped third section,
   a central horse-iron-shaped forth section extending around a centre of the main surface, the orientation of the C-shaped forth section being opposite the orientation of the C-shaped third section,
   a fifth section wherein the plurality of parallel channels is led back to the outer contour of the main surface, and
   a final section wherein the plurality of parallel channels extends in a curve along the outer contour of the main surface until it reaches the fluid discharge port.

2. The separator plate according to claim 1, wherein the number of parallel channels forming the flow path is decreased by merging adjacent channels between the first section and the second section and again between the fifth section and the final section.

3. The separator plate according to claim 2, wherein the number of parallel channels forming the flow path is divided by two between the first section and the second section and between the fifth section and the final section, respectively.

4. The separator plate according to claim 1, wherein adjacent channels are separated by ridges, wherein the width of the ridges separating adjacent channels of a same section is smaller than the width of the ridges separating adjacent channels of different sections.

5. The separator plate according to claim 1, wherein the pressure gradient is substantially the same for all channels of the flow path.

6. The separator plate according to claim 1, wherein the width of a ridge separating two adjacent channels in the flow path varies over the flow path.

7. A fuel cell structure comprising an oxidant separator plate, a fuel separator plate, and a cell unit sandwiched there between, said cell unit comprising a membrane electrolyte assembly with a fuel gas diffusion layer, a catalyst layer, an oxidant gas diffusion layer and a catalyst layer, and a membrane, wherein said separator plates are separator plates according to any of the preceding claims.

8. The fuel cell structure according to claim 7, wherein the oxidant separator plate and the fool separator plate have an identical structure, the only difference between the oxidant separator plate and the fuel separator plate being the depth of the channels.

9. The fuel cell structure according to claim 7 wherein at least one of the separator plates contains a flow field for the coolant on a main surface of the plate opposite the main surface of the plate on which the gas flow field is positioned.

10. The separator plate according to claim 1, wherein the number of parallel channels forming the flow path is decreased by merging some of the channels between the first section and the final section in more than one step and at more than one location so as to equalize the average gas flow velocity.

11. The separator plate according to claim 10, wherein the number of parallel channels forming the flow path is divided by less or equal than two between the first section and the final section at the location where the reduction of channel is realized.

* * * * *